(12) United States Patent
Ezra

(10) Patent No.: US 9,027,809 B1
(45) Date of Patent: May 12, 2015

(54) PLATFORM FOR TRANSPORTING OR STORING GOODS

(71) Applicant: Leslie P Ezra, Winemac, IN (US)

(72) Inventor: Leslie P Ezra, Winemac, IN (US)

( * ) Notice: Subject to any disclaimer, the term of this patent is extended or adjusted under 35 U.S.C. 154(b) by 25 days.

(21) Appl. No.: 14/020,270

(22) Filed: Sep. 6, 2013

(51) Int. Cl.
| *B60R 9/06* | (2006.01) |
| *B60R 9/00* | (2006.01) |
| *E04G 5/08* | (2006.01) |
| *B60R 11/00* | (2006.01) |

(52) U.S. Cl.
CPC ... *B60R 9/00* (2013.01); *E04G 5/08* (2013.01); *B60R 2011/0082* (2013.01); *B60R 9/06* (2013.01)

(58) Field of Classification Search
USPC .......... 224/499, 497, 519, 524; 108/166, 162, 108/164, 165, 167, 168, 171, 172
See application file for complete search history.

(56) References Cited

U.S. PATENT DOCUMENTS

| 565,563 | A | * | 8/1896 | Phillips | 224/432 |
|---|---|---|---|---|---|
| 784,781 | A | * | 3/1905 | Davis | 108/65 |
| 1,116,039 | A | * | 11/1914 | Dunham | 224/499 |
| 1,553,036 | A | * | 9/1925 | Foss | 108/171 |
| 1,585,871 | A | * | 5/1926 | Pels | 224/497 |
| 1,639,879 | A | * | 8/1927 | Buffington | 296/61 |
| 1,743,220 | A | * | 1/1930 | Johnson | 224/499 |
| 1,807,371 | A | * | 5/1931 | Binns | 224/499 |
| 1,853,608 | A | * | 4/1932 | Gundry | 224/499 |
| 1,900,438 | A | * | 3/1933 | Erickson et al. | 224/499 |
| 1,925,216 | A | * | 9/1933 | Swartz | 108/93 |
| 1,941,860 | A | * | 1/1934 | Hanson | 224/498 |
| 2,232,353 | A | * | 2/1941 | Votypka | 296/24.33 |
| 2,841,831 | A | * | 7/1958 | MackIntosh | 52/7 |
| 3,091,816 | A | * | 6/1963 | Wetzel | 108/172 |
| 3,680,942 | A | * | 8/1972 | Davis | 312/317.3 |
| 3,884,159 | A | * | 5/1975 | Faria | 108/168 |
| 3,913,811 | A | | 10/1975 | Spencer | |
| 4,443,034 | A | * | 4/1984 | Beggs | 296/65.17 |
| 5,427,289 | A | * | 6/1995 | Ostor | 224/499 |
| 5,577,452 | A | * | 11/1996 | Yindra | 108/168 |
| 5,823,595 | A | * | 10/1998 | Tronco | 296/26.03 |
| 5,845,585 | A | * | 12/1998 | Meeus et al. | 108/44 |
| 6,382,486 | B1 | * | 5/2002 | Kretchman et al. | 224/498 |
| 6,470,517 | B1 | * | 10/2002 | Kang | 5/118 |
| 6,712,248 | B2 | | 3/2004 | Mitchell | |
| 7,246,733 | B2 | * | 7/2007 | Threet et al. | 224/498 |
| 7,628,439 | B1 | * | 12/2009 | Strong | 296/26.03 |
| 7,992,751 | B1 | * | 8/2011 | Sweeney | 224/497 |
| 8,033,435 | B1 | * | 10/2011 | Brooke | 224/404 |
| RE44,454 | E | * | 8/2013 | Aghajanian | 224/499 |
| 8,556,145 | B1 | * | 10/2013 | Ezra | 224/498 |
| 8,857,688 | B1 | * | 10/2014 | Bell, III | 224/497 |
| 2003/0168487 | A1 | * | 9/2003 | Lane et al. | 224/499 |
| 2003/0173387 | A1 | * | 9/2003 | Mitchell | 224/499 |
| 2005/0092799 | A1 | | 5/2005 | Morris | |
| 2005/0133556 | A1 | | 6/2005 | Bolin | |
| 2007/0175938 | A1 | * | 8/2007 | Swenson | 224/498 |
| 2009/0056592 | A1 | * | 3/2009 | Threet et al. | 108/11 |
| 2010/0001029 | A1 | * | 1/2010 | Tai | 224/499 |

\* cited by examiner

*Primary Examiner* — Justin Larson
(74) *Attorney, Agent, or Firm* — Mathew R. P. Perrone, Jr.

(57) ABSTRACT

A lightweight platform is formed by using plastic, aluminum, or an open spaced metal. The platform consists of a front section, a middle section, and a rear section. The front and rear sections may have side walls of any height. End walls may be attached if desired. The front section is connected to the middle section by hinges located on a top surface of the platform. The middle section is connected to the rear section by hinges located on a bottom surface of the platform. The platform moves from an open position to a closed position and back easily and without the necessity of latches.

13 Claims, 20 Drawing Sheets

PLATFORM FOR TRANSPORTING OR STORING GOODS

This invention relates to a platform for transporting or storing goods, and more particularly to a platform for transporting or storing goods which may be folded or opened as desired for use.

BACKGROUND OF THE INVENTION

Efficient storage or transport of goods can be problematic. Any storage device must provide access to the goods, while maintaining good storage capability. To that end, many different platforms are used. Typical platforms of the prior art can hold the goods. However, those platforms tend to cause problems when not in use. It is difficult to store or transport unused platforms.

When not in use, a platform can be an obstacle and consume valuable warehouse space. When in use, a platform can deny easy access to goods stored thereon. Thus, it becomes necessary to develop a platform that is effective when used, and easily transported or stored when desired.

A folding platform can be used to solve these problems. With a folding platform, the goal is to create a platform that can be moved from the closed position to an open and usable position with one smooth movement, and returned to the closed position by reversing that same movement. Such utility is difficult to obtain. If the platform is stable enough to support goods, then that stability works against smooth and easy movement between the open and closed positions.

It is also very desirable for a platform to retain a portion of usable space when it is in a closed position. Usually however, the closed position eliminates the usability of platform. Yet, a smaller platform can be useful for storage. Therefore, if the closed position for the platform can retain some usability, advantages are obtained.

A further problem for a foldable platform is the requirement of latches to hold the platform in the open or the closed position. The latch itself can be a problem. Typically, a latch can break, or interfere with the operation of the foldable platform. For example, a latch can complicate the moving of the platform from the closed position to the open position and back.

Also, tall sides are sometimes needed on a platform. Those sides interfere with the functioning of the platform. This is especially true in the case of a platform which can be moved from the closed to the open position. Such tall sides can interfere with the functioning of a foldable platform.

A further desire is that the platform be lightweight platform, yet capable of holding a substantial load. However, weight and strength of the platform usually work together.

If such a platform can be developed having strength, light weight, flexibility to move between open and closed positions while avoiding the latch problem, great advantages can be obtained.

SUMMARY OF THE INVENTION

Among the many objectives of this invention is the provision of a foldable platform, which may be moved from a closed position to an open and usable position with one smooth movement, and returned to the closed position by reversing that same movement.

A further objective of this invention is the provision of a foldable platform, which is easily folded.

Still another further objective of this invention is the provision of a foldable platform, which is easily unfolded.

Yet a further objective of this invention is the provision of a foldable platform that does not require the use of latches to lock it in the open or closed position.

Another objective of this invention is the provision of a foldable platform, which minimizes interference with vehicle use.

Yet another objective of this invention is the provision of a foldable platform which incorporates folding movements that allow the use of tall sides on the platform.

Still another objective of this invention is the provision of a foldable platform which includes a portion of usable space when closed.

Yet still another objective of this invention is the provision of a foldable platform which saves space when closed.

A further objective of this invention is the provision of a lightweight foldable platform that can hold a substantial load.

Another objective of this invention is the provision of a foldable platform which is easily adjustable.

Yet another objective of this invention is the provision of a foldable platform which minimizes interference with the use of a vehicle to which it may be attached.

Still another objective of this invention is the provision of a foldable platform which permits a person to enter a vehicle more easily.

Also, an objective of this invention is the provision of a foldable platform which permits a person to leave a vehicle more easily.

These and other objectives of the invention (which other objectives become clear by consideration of the specification, claims and drawings as a whole) are met by providing a lightweight platform preferably made from plastic, aluminum, or an open spaced metal. The platform consists of a front section, a middle section, and a rear section. The front and rear sections may have end walls of any height. Side walls may be attached if desired. The front section is connected to the middle section by hinges located on a top surface of the platform. The middle section is connected to the rear section by hinges located on a bottom surface of the platform. The platform can be easily interconverted between an open position and a closed position without the necessity of latches.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
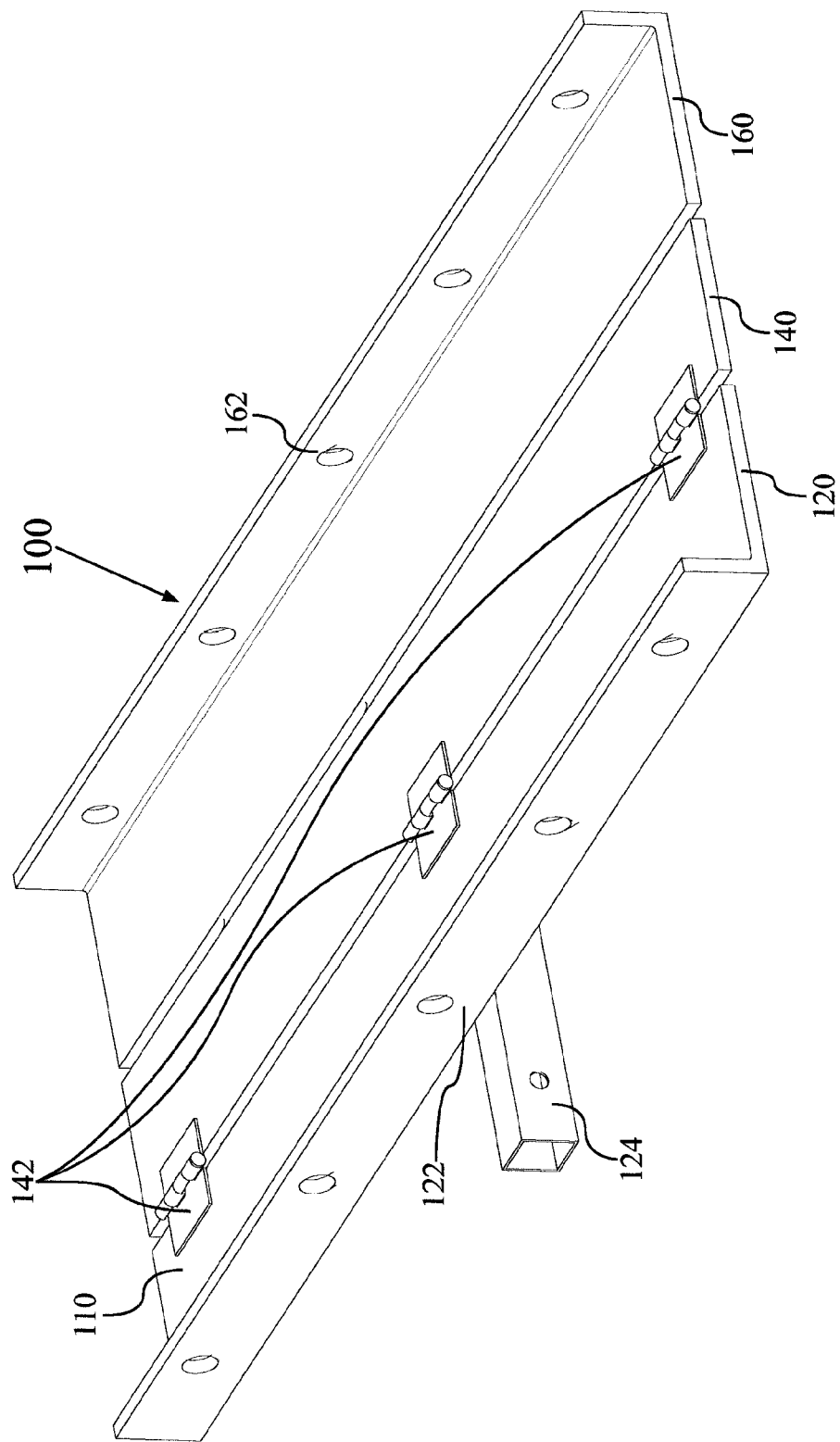
FIG. 1 depicts a front perspective view of the foldable platform 100 of this invention in open position 102 as a form of tray 400 (FIG. 16).

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

Now adding FIGS. 1-15 to the consideration, the structure and function of foldable platform 100 can be clearly seen. In FIGS. 1-5, the foldable platform 100 is shown in open position 102, as a form of a foldable carrier tray 400 (FIG. 16). In FIGS. 6-9, the foldable platform 100 is shown in intermediate position 104. In FIGS. 10-14, the foldable platform 100 is shown in folded position 106.

Figure 6:
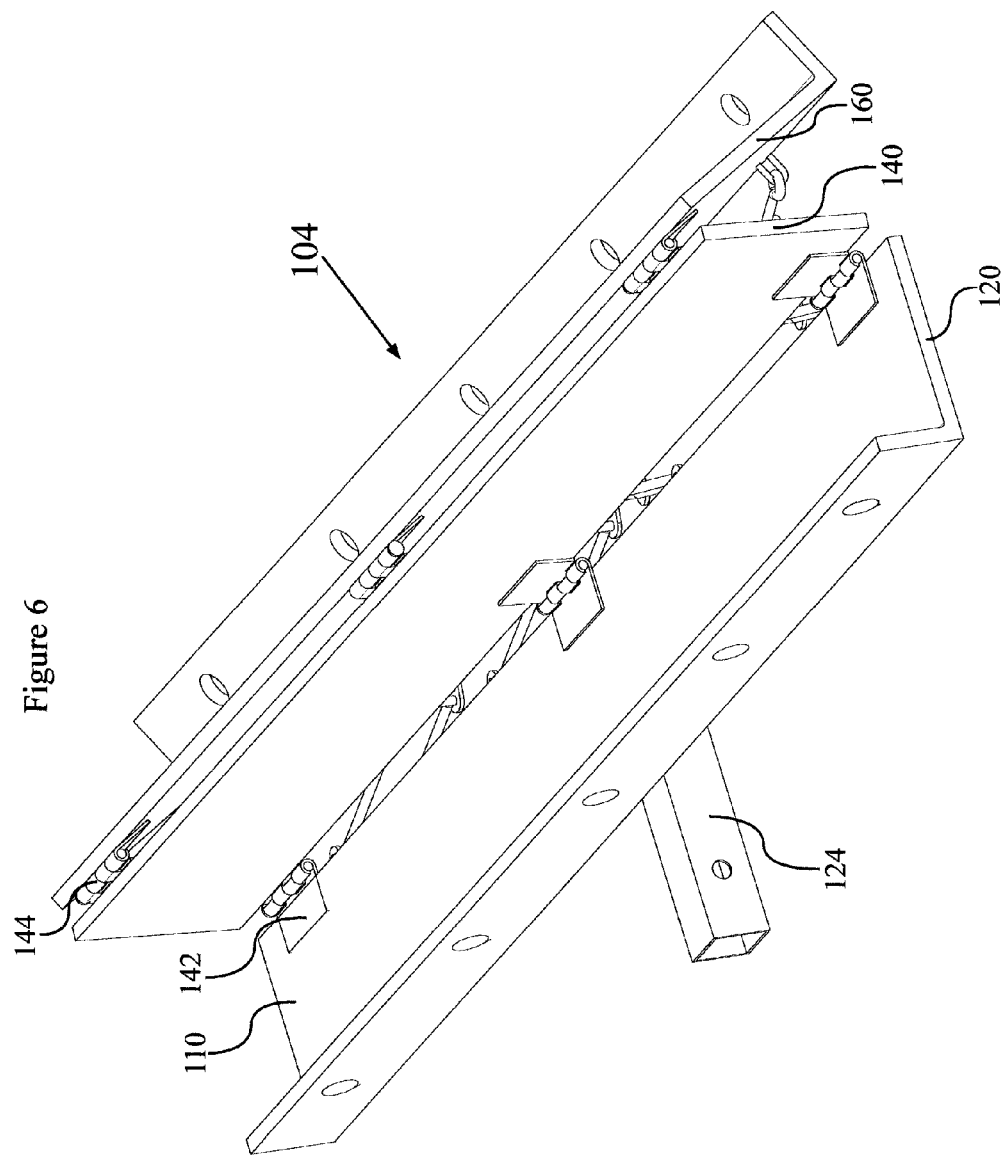
FIG. 6 depicts a front perspective view of the foldable platform 100 of this invention in intermediate position 104.

The foldable platform 100 consists of a front section 120, a middle section 140, and a rear section 160. The front section 120 may have a front end wall 122 of any height; and the rear section 160 may have a rear end wall 162 of any height. Side walls may also be attached if desired. The front section 120 is connected to the middle section 140 by front hinges 142 located on a top surface 110 of the platform 100. The middle section 140 is connected to the rear section 160 by middle hinges 144 located on the bottom surface 112 of the platform 100. The location of the hinges allows the sections to be folded to an open position 102 (FIG. 1) or a closed position 106 (FIG. 10) through an intermediate position 104 (FIG. 6).

Figure 2:
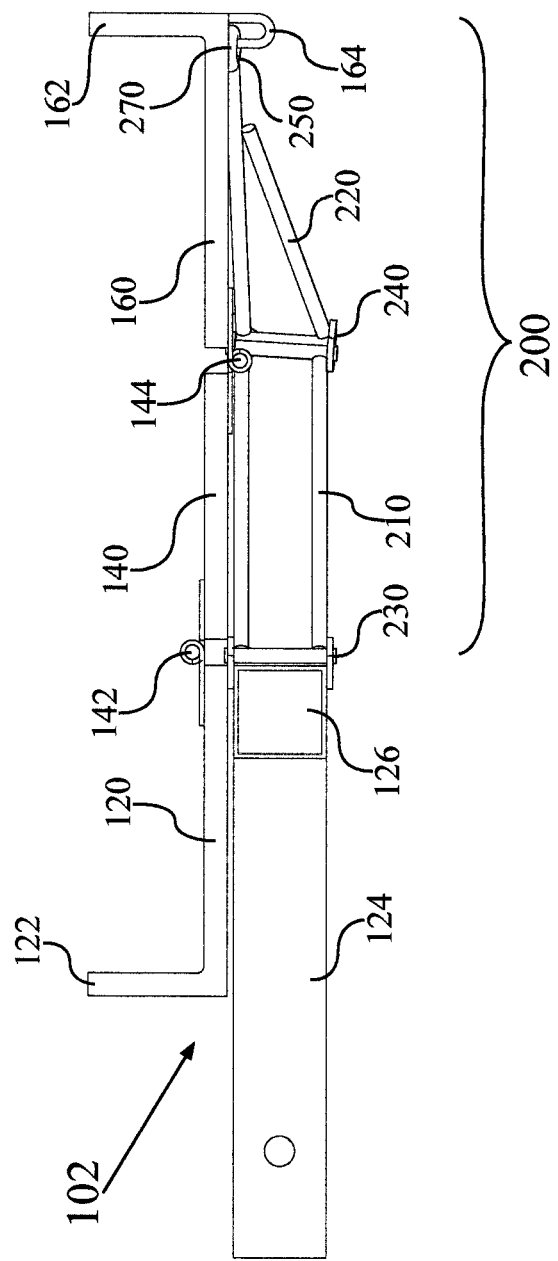
FIG. 2 depicts a side view of the foldable platform 100 of this invention in open position 102.
Figure 3:
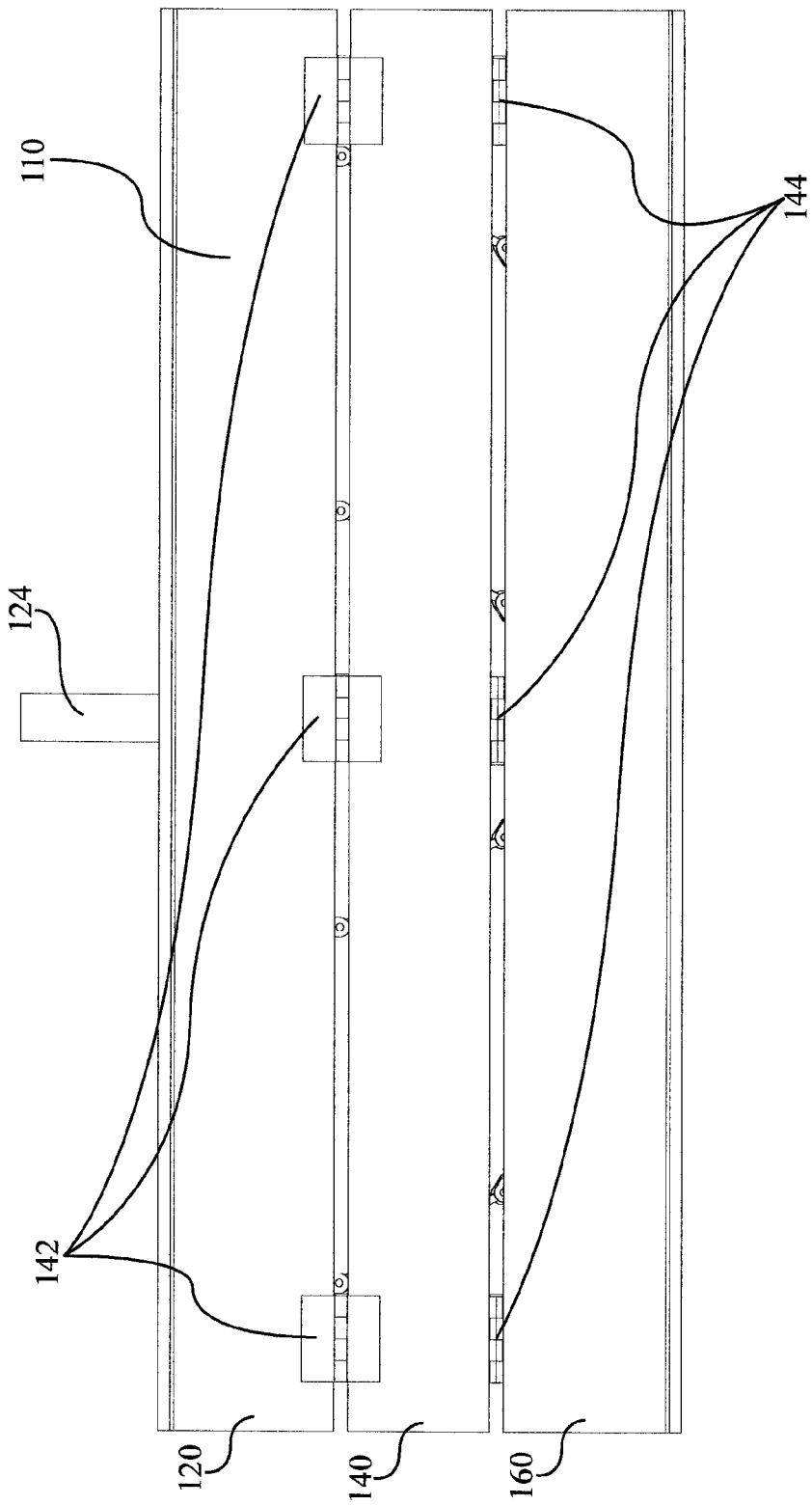
FIG. 3 depicts a top plan view of the foldable platform 100 of this invention in open position 102.
Figure 4:
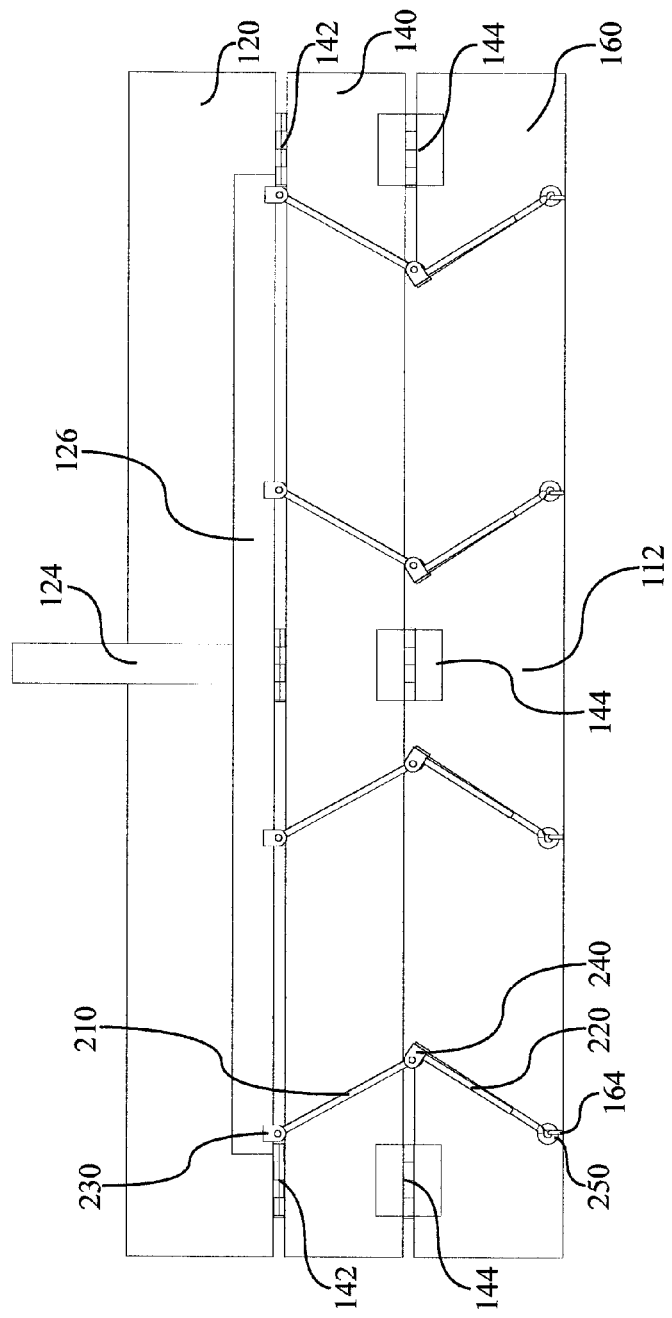
FIG. 4 depicts a bottom plan view of the foldable platform 100 of this invention in open position 102.
Figure 5:
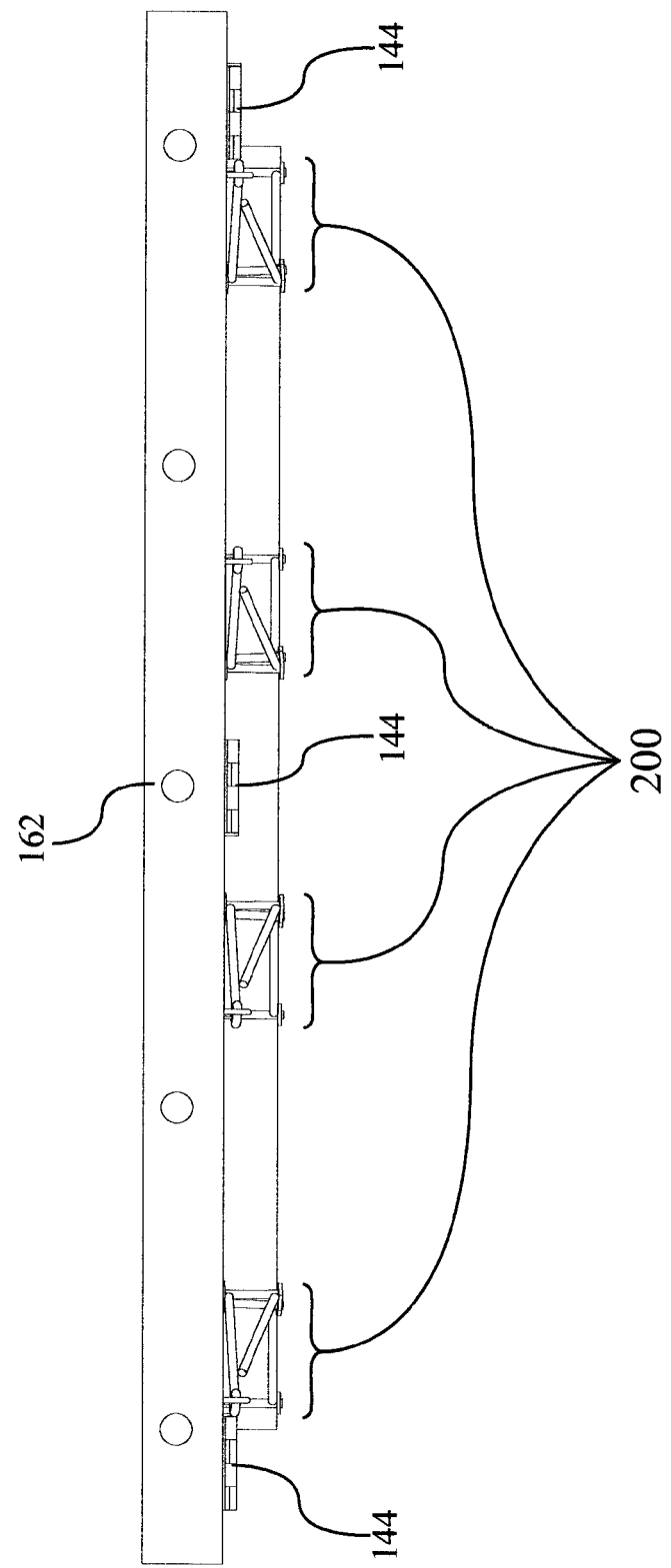
FIG. 5 depicts a rear plan view of the foldable platform 100 of this invention in open position 102.

The platform 100 must be supported with a structure beneath it. For example, FIG. 2 and FIG. 4 show a main support 126 located under front section 120. Main support 126 is preferably located near the rear of front section 120 to support all weight being placed on front section 120. Four or more bi-fold outriggers 200 extend rearward from main support 126 to support middle platform section 140 and rear platform section 160. Outrigger 200 supports any weight on platform 100 that is not located over the main support 126.

Figure 15:
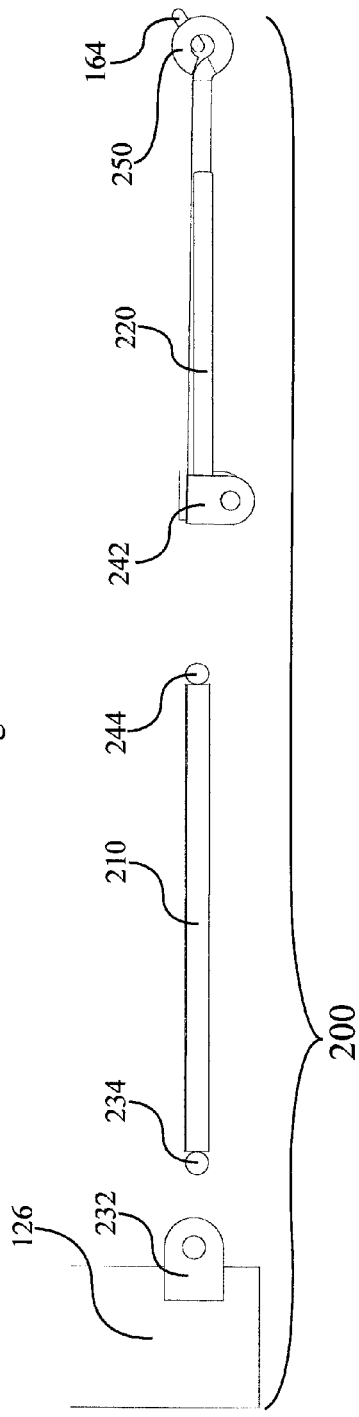
FIG. 15 depicts an exploded top plan view of the bi-fold outrigger 200 of this invention.
Figure 16:
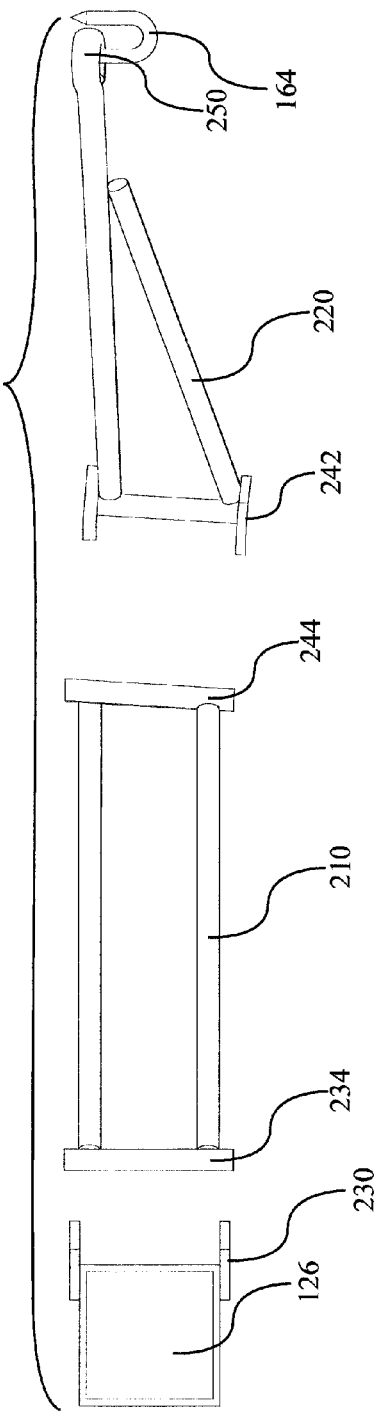
FIG. 16 depicts an exploded side view of the bi-fold outrigger 200 of this invention.

FIG. 4, FIG. 15 and FIG. 16 show bi-fold outrigger 200 in greater detail. Outrigger 200 can comprise an inner arm 210 which extends beneath middle platform section 140. Outrigger 200 can also comprise an outer arm 220 which extends beneath rear platform section 160. Inner arm 210 is attached to main support 126 by a front pivot joint 230. Inner arm 210 is attached to outer arm 220 by a middle pivot joint 240. In one embodiment, front pivot joint 230 is comprised of a front pivot female component 232 on main support 126 engaged with a front pivot male component 234 on inner arm 210 (FIG. 15 and FIG. 16). In another embodiment, middle pivot joint 240 is comprised of a middle pivot female component 242 on outer arm 220 engaged with a middle pivot male component 244 on inner arm 210 (FIG. 15 and FIG. 16).

Outer arm 220 includes a looped end 250. A U-shaped fastener 164 is attached to the rear of rear platform section 160, and interfaces with looped end 250 to form a rear flexible joint 270 which can pivot vertically and horizontally (FIG. 15 and FIG. 16). The resulting rear flexible joint 270 flexibly connects outer arm 220 to rear platform section 160.

In a preferred embodiment of open position 102 shown in FIG. 4, the outriggers 200 are intentionally not fully extended to ensure that they do not become locked when a closing force is applied. One half of the mostly-extended outriggers 200 have a middle pivot joint 240 on the right side of outer arm 220, and the other one half of the mostly-extended outriggers 200 have a middle pivot joint 240 on the left side of the outer arm 220.

Figure 7:
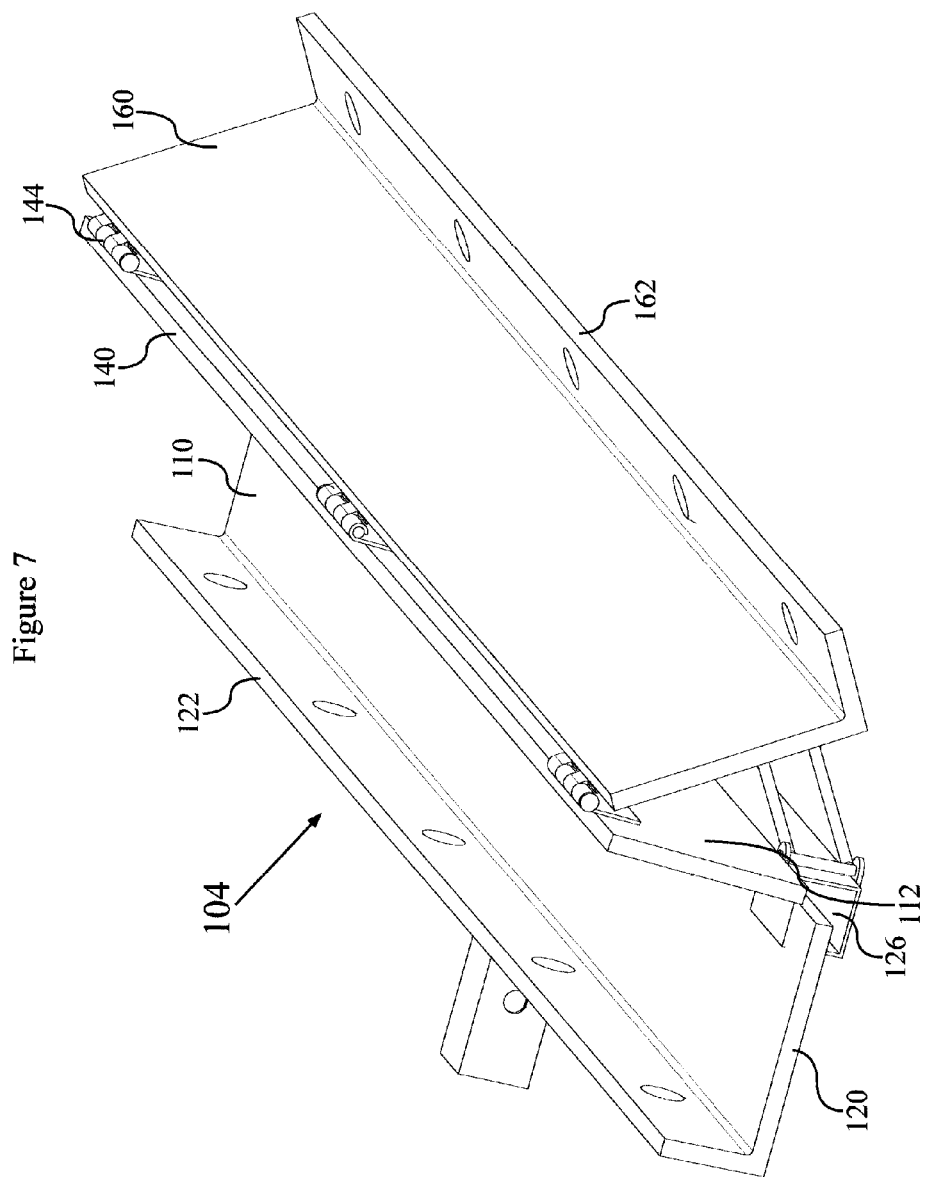
FIG. 7 depicts a side perspective view of the foldable platform 100 of this invention in intermediate position 104.
Figure 8:
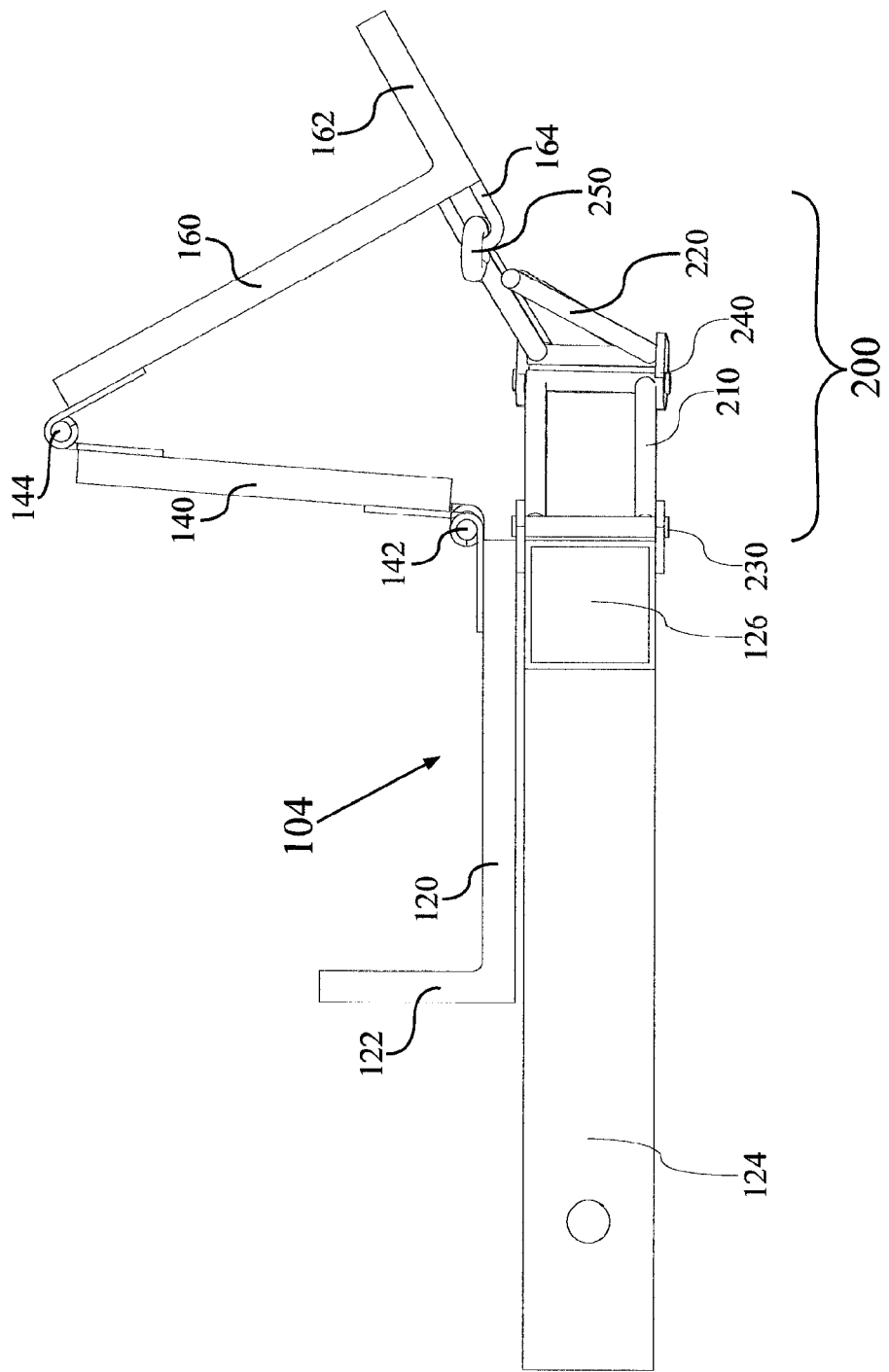
FIG. 8 depicts a side view of the foldable platform 100 of this invention in intermediate position 104.
Figure 9:
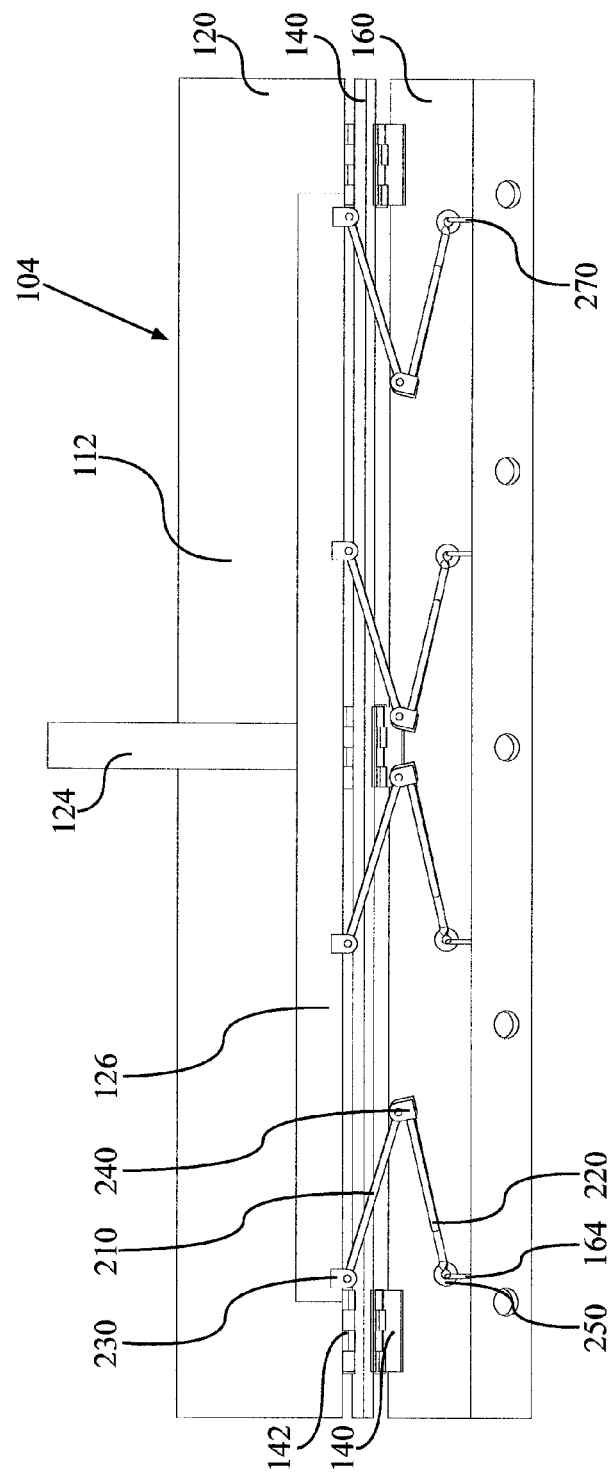
FIG. 9 depicts a bottom plan view of the foldable platform 100 of this invention in intermediate position 104.
Figure 10:
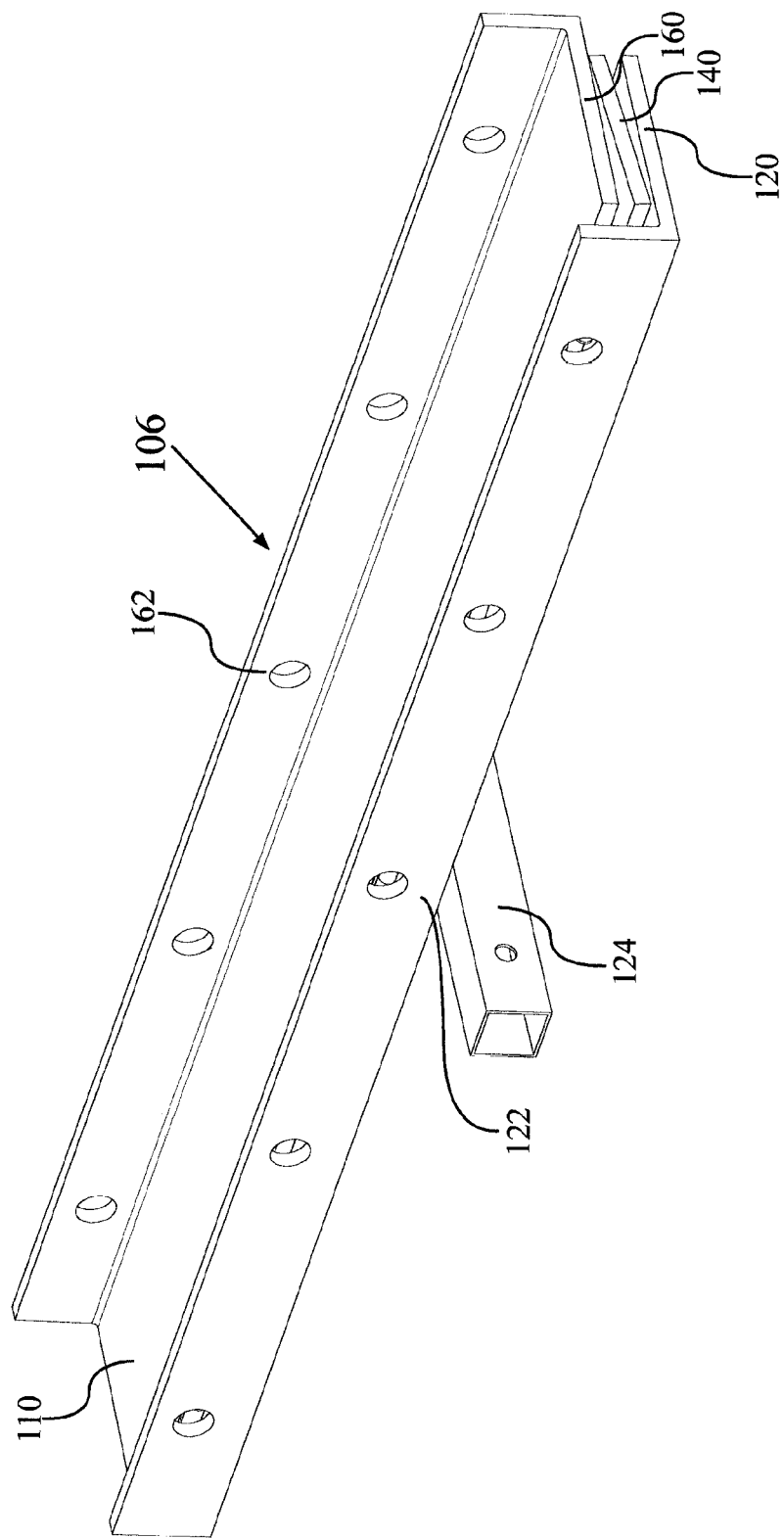
FIG. 10 depicts a front perspective view of the foldable platform 100 of this invention in folded position 106.
Figure 11:
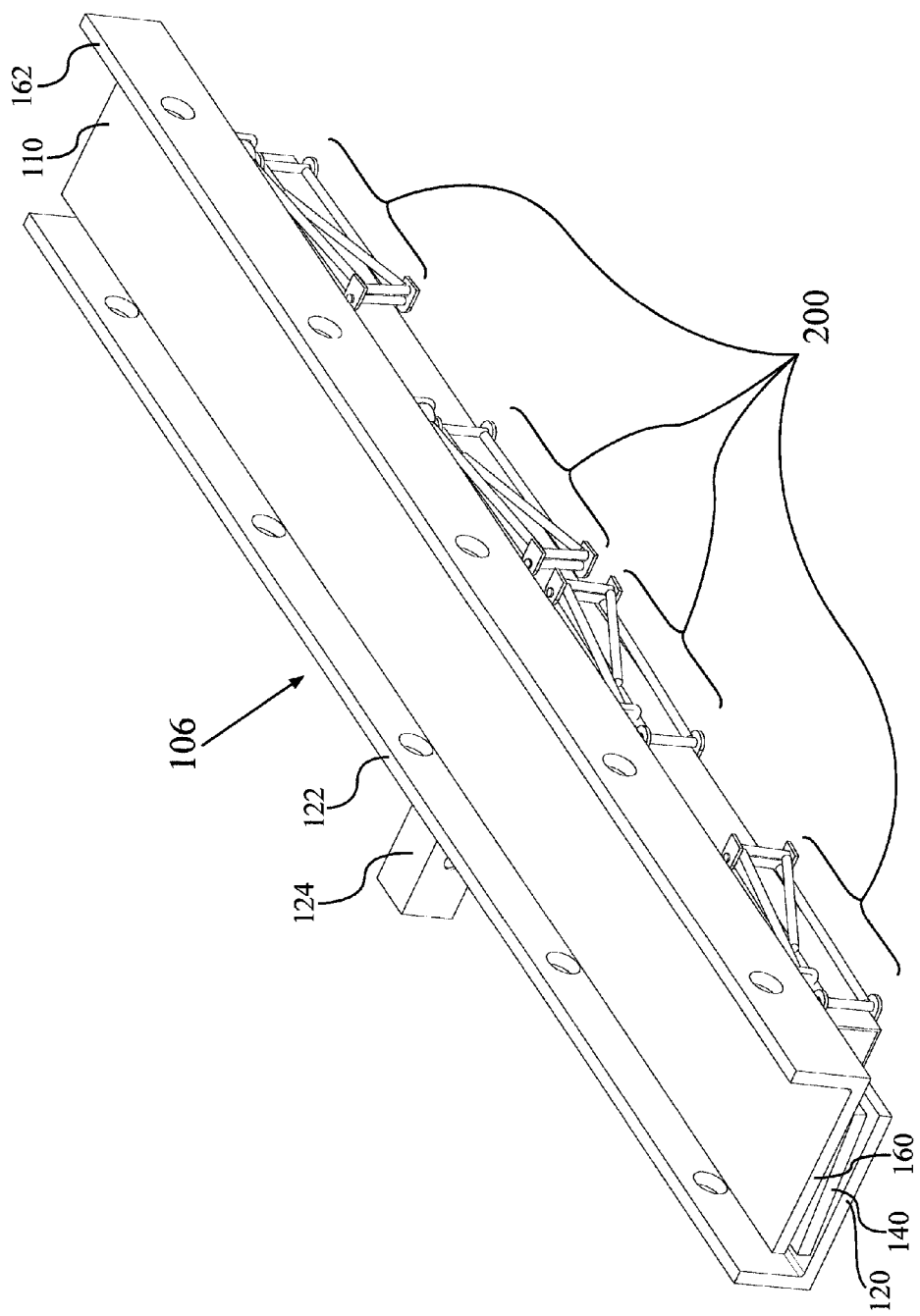
FIG. 11 depicts a rear perspective view of the foldable platform 100 of this invention in folded position 106.
Figure 12:
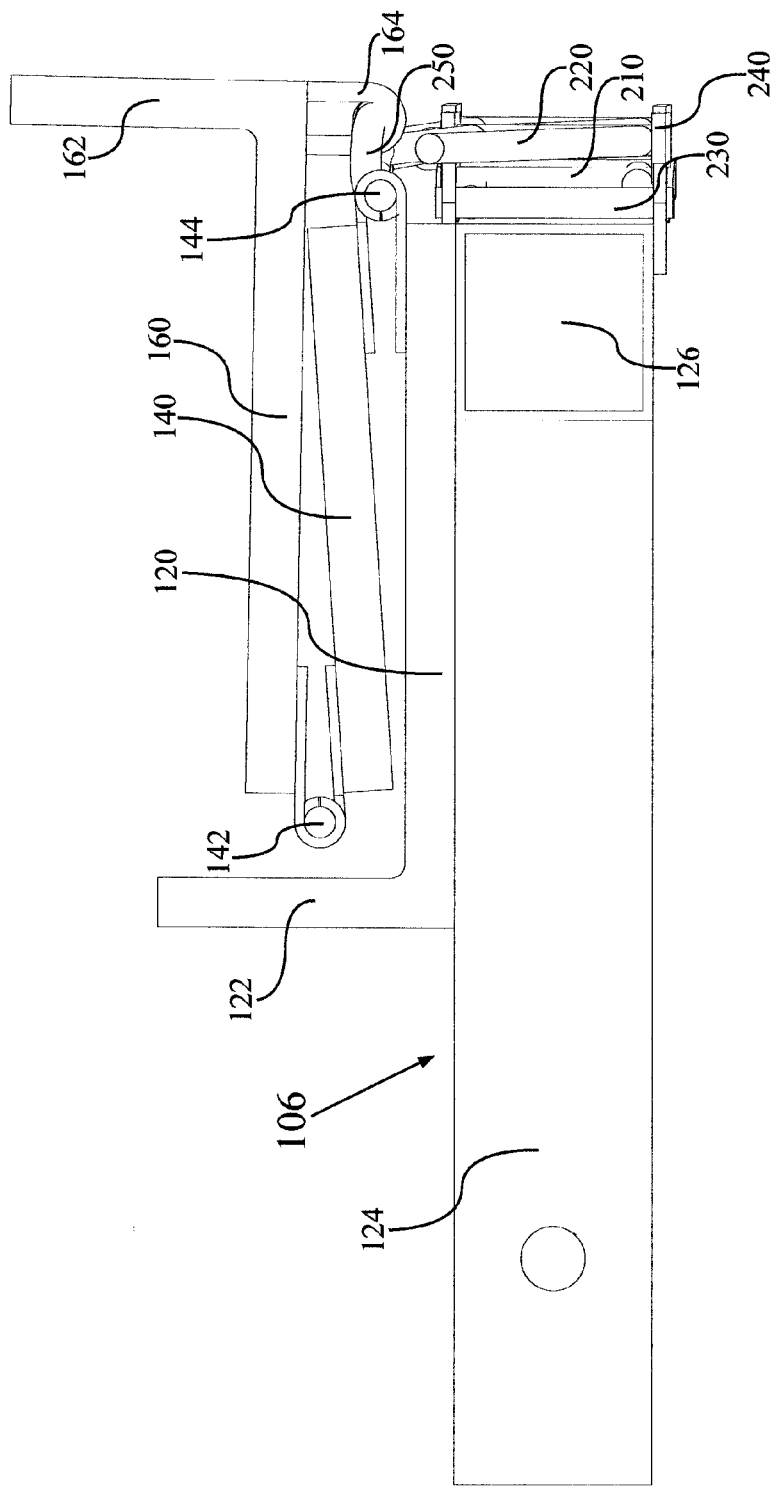
FIG. 12 depicts a side view of the foldable platform 100 of this invention in folded position 106.
Figure 13:
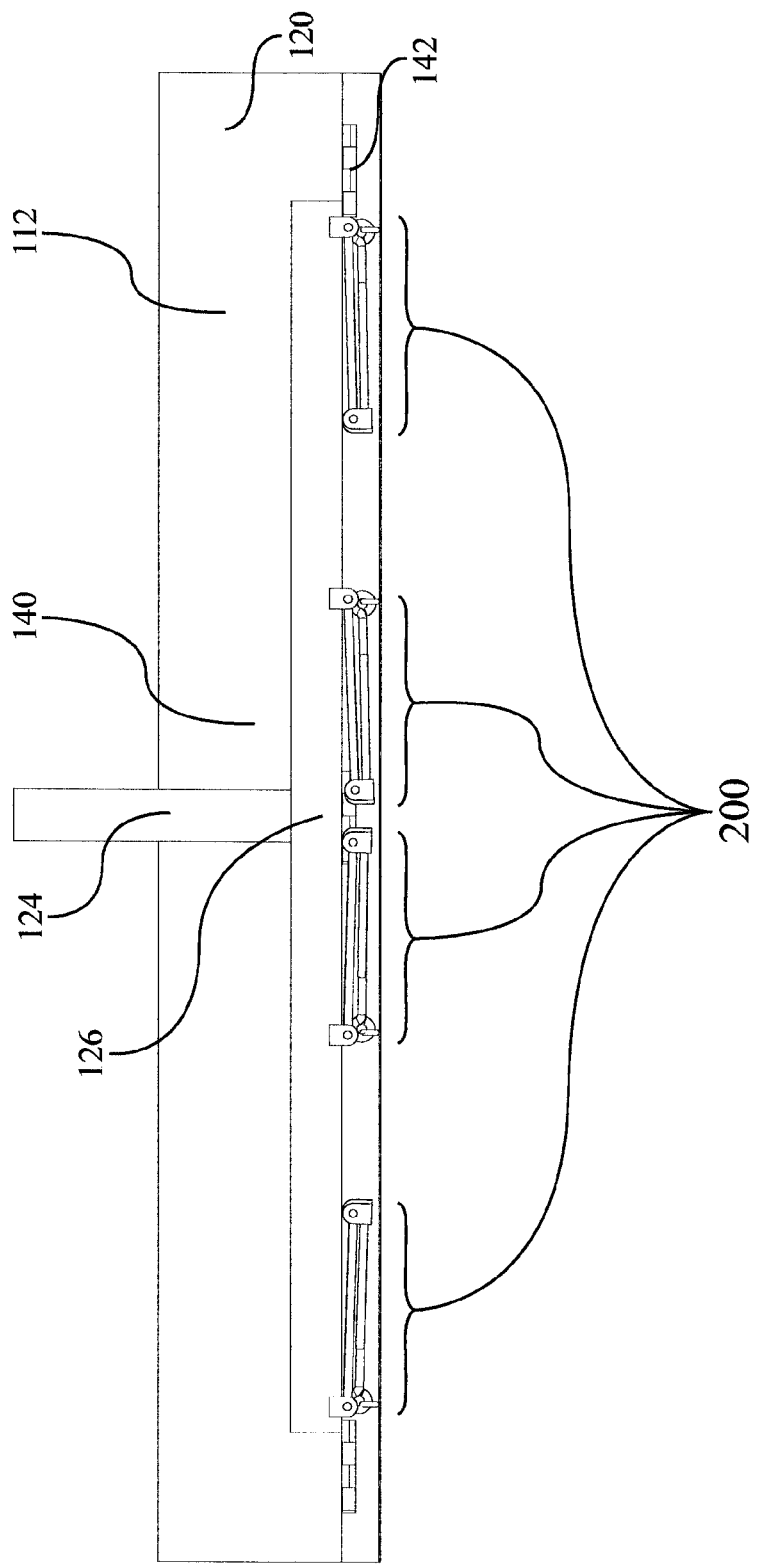
FIG. 13 depicts a bottom plan view of the foldable platform 100 of this invention in folded position 106.
Figure 14:
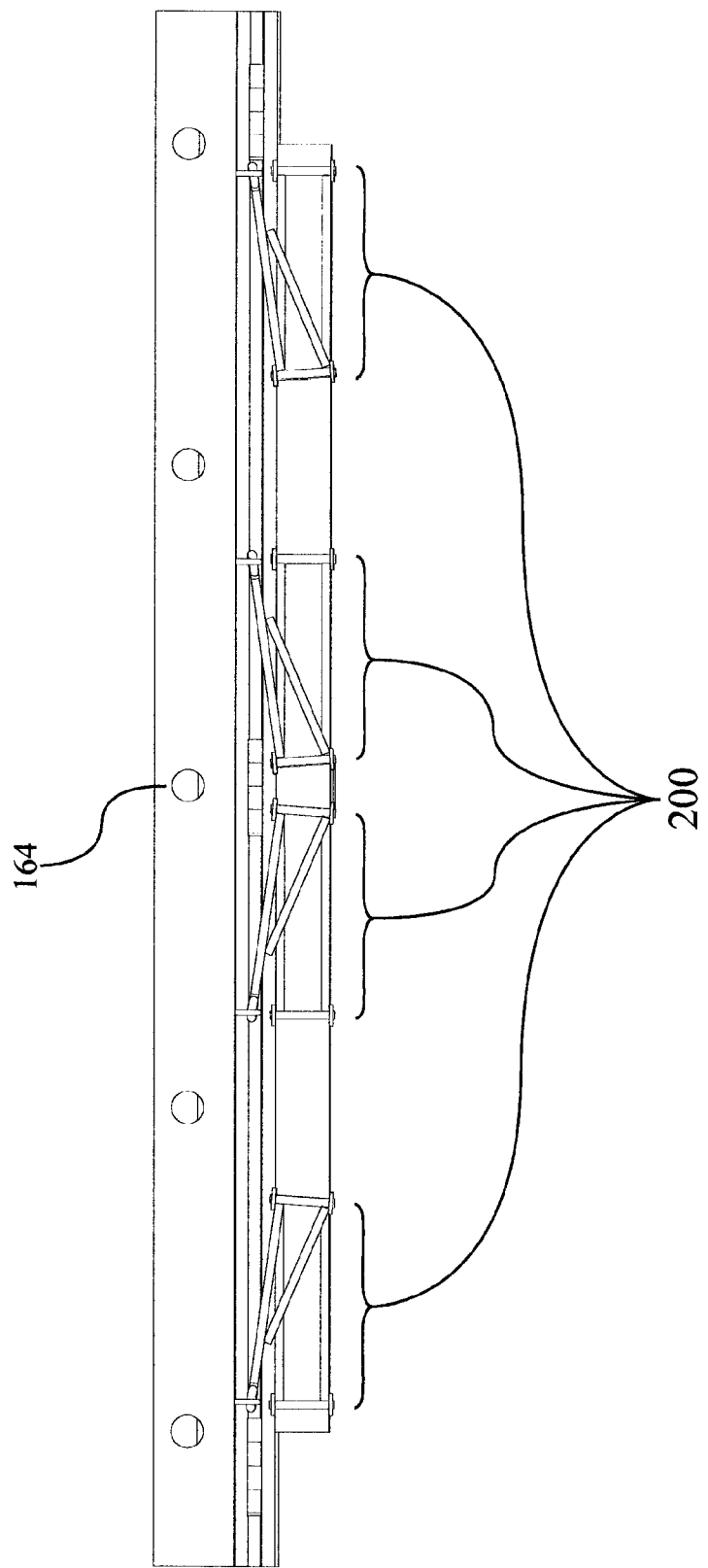
FIG. 14 depicts a rear plan view of the foldable platform 100 of this invention in folded position 106.

As the platform is folded from open position 102 to intermediate position 104, the outriggers 200 move from being mostly extended (FIG. 2 and FIG. 4) to being mostly folded (FIG. 7, FIG. 8, and FIG. 9). As the platform is folded from intermediate position 104 to the closed position 106, the outriggers 200 move from being mostly folded (FIG. 7, FIG. 8, and FIG. 9) to being fully folded and stowed aside main support 126 (FIG. 11, FIG. 12, and FIG. 13).

In a preferred embodiment of outrigger 200 shown in FIG. 8 and FIG. 15, middle pivot joint 240 has a tilted axis 260 of four degrees or more which allows outer arm 220 to be level with inner arm 210 when outrigger 200 is mostly extended in open position 102. Tilted axis 260 also allows looped end 250 to be partially raised when outrigger 200 is mostly folded in intermediate position 104, and to be fully raised when outrigger 200 is fully folded in to the closed position 106.

Each looped end 250 of the outrigger 200 must be raised by tilted axis 260 in an amount equal to the combined thickness of front section 120 and middle section 140. Raising looped end 250 to a sufficient height allows outer arm 220 to remain connected to both inner arm 210 (through middle pivot joint 240 having tilted axis 260) and rear section 160 (through rear flexible joint 270) in all three of open position 102, intermediated position 104, and folded position 106 of platform 100; and also allows rear section 160 to sit above front section 120 and middle section 140 when platform 100 is in folded position 106. As an example, if front section 120 is 1.25 centimeters thick and the middle section 140 is 1.25 centimeters thick, then tilted axis 260 should be at an angle which allows looped end 250 to be raised at least 2.50 centimeters from when platform 100 is in open position 102 to when platform 100 is in folded position 106.

Rear flexible joint 270 facilitates a permanent attachment of the outer arm 220 to the rear platform section 160. The permanent attachment of the outer arm 220 of the bi-fold outriggers 200 to the rear platform section 160 is very important in both open position 102 and folded position 106. When platform 100 is in open position 102 for use, the attached outriggers 200 stabilize rear section 160 and prevent it from being inadvertently lifted up. The attachment of the outrigger 200 to rear section 160 performs the same function when the platform 100 is in folded position.

The permanent attachment of the outer arm 220 of outrigger 200 to rear platform section 160 also functions to remove a need for latches. The outrigger 200 cannot be freely folded without pulling in the u-shaped fastener 164 of rear section 160, thus transitioning platform 100 into intermediate position 104. However, any weight on open platform 100 will resist transitioning platform 100 into intermediate position 104, and thus will resist any pulling by outrigger 200 on the u-shaped fastener 164. Since platform 100 will have enough natural weight to resist an unaided transition of platform 100 into intermediate position 104, an open platform 100 will remain locked open until a user transitions the platform 100 into intermediate position 104 by applying a small amount of force to lift the rear section 160 and middle section 140.

To transition platform 100 from open position 102 to intermediate position 104, a user tips back and pushes forward the rear end wall 162 of rear section 160, thereby forcing the rear hinges 144 that connect the rear section 160 to the middle section 140 to raise up (FIG. 6-8). As the platform 100 is folded from open position 102 to intermediate position 104, the outriggers 200 move from being mostly extended (FIG. 2 and FIG. 4) to being mostly folded (FIG. 7, FIG. 8, and FIG. 9).

To continue transition of platform 100 from intermediate position 104 to folded position 106, the user continues to push forward the rear section 160. The folding of front hinge 142 results in the top surface 110 of middle section 140 being pushed over and lowered onto the top surface 110 of front section 120 (FIG. 11 and FIG. 12). Likewise, the folding of rear hinge 144 results in the bottom surface 120 of rear section 160 being pushed over and lowered onto the bottom surface 120 of middle section 140 (FIG. 11 and FIG. 12). As the platform 100 is folded from intermediate position 104 to folded position 106, the outriggers 200 move from being mostly folded (FIG. 7, FIG. 8, and FIG. 9) to being fully folded and stowed aside main support 126 (FIG. 11, FIG. 12, and FIG. 13).

Once platform 100 is in the closed position 106, rear section 160 sits directly above the middle section 140, and the middle section 140 sits directly above the front section 120. To open the platform 100 from folded position 106 to open position 102, a user tips back and pulls backward on the rear end wall 162 of rear section 160 to reverse the process.

The folding movement of platform 100 does not bind up like wide drawers do, so a user can open or close the platform 100 with only little force on one end of the rear section 160. Additionally, the folding of the platform 100 is quick and easy because the platform can fully function in both open position 102 and closed position 106 without the need of latches.

Longer folding platforms 100 can be made by making a longer main tube 126 and adding outriggers 200. The platform 100 can become automated by connecting a powered actuator to a modified bi-fold outrigger 200.

The carrier tray 100 can be mounted on a wall or on a vehicle. Other suitable mounting surfaces are also effective. To create a lightweight platform 100 the use of plastic, aluminum, or an open spaced metal is preferred.

Figure 17:
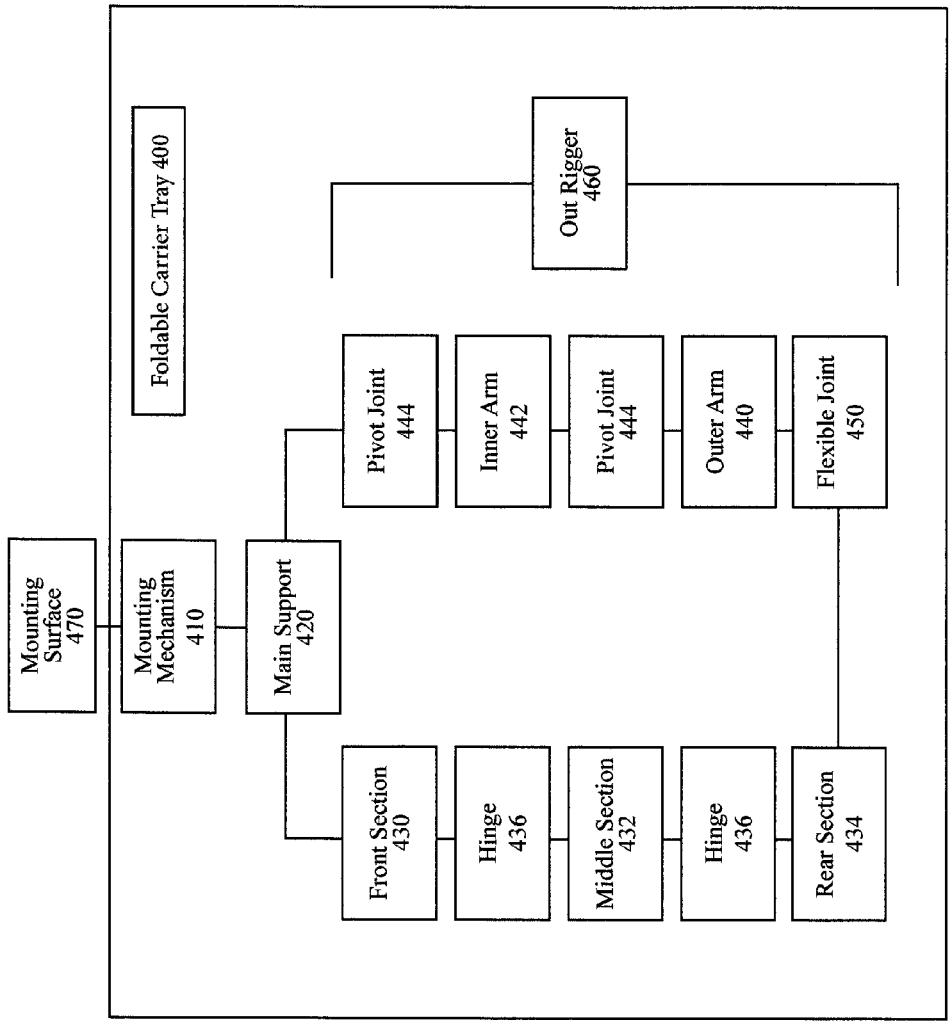
FIG. 17 depicts a box diagram of carrier tray 400.

Turning now to FIG. 17, foldable carrier tray 400 is depicted. Foldable carrier tray 400 as has, as a specific embodiment thereof, foldable platform 100. Foldable carrier tray 400 has a mounting mechanism 410, which can be attached to any suitable mounting surface 470. Mounting mechanism 410 is attached to main support 420. Main support 420 is attached to front section 430. A hinge 436 connects front section 430 to middle section 432. A second hinge 436 then connects middle section 432 to rear section 434.

Rear section 434 is also connected to flexible joint 450. Flexible joint 450 is connected to outer arm 440. A pivot joint 444 connects outer arm 440 to inner arm 442. Inner arm 442 is connected by a second pivot joint 444 to main support 420. Outrigger 460 is comprised of pivot joints 444, inner arm 442, outer arm 440, and flexible joint 450. Such a structure makes foldable carrier tray 400 operable and mountable on any desired surface 470.

Figure 18:
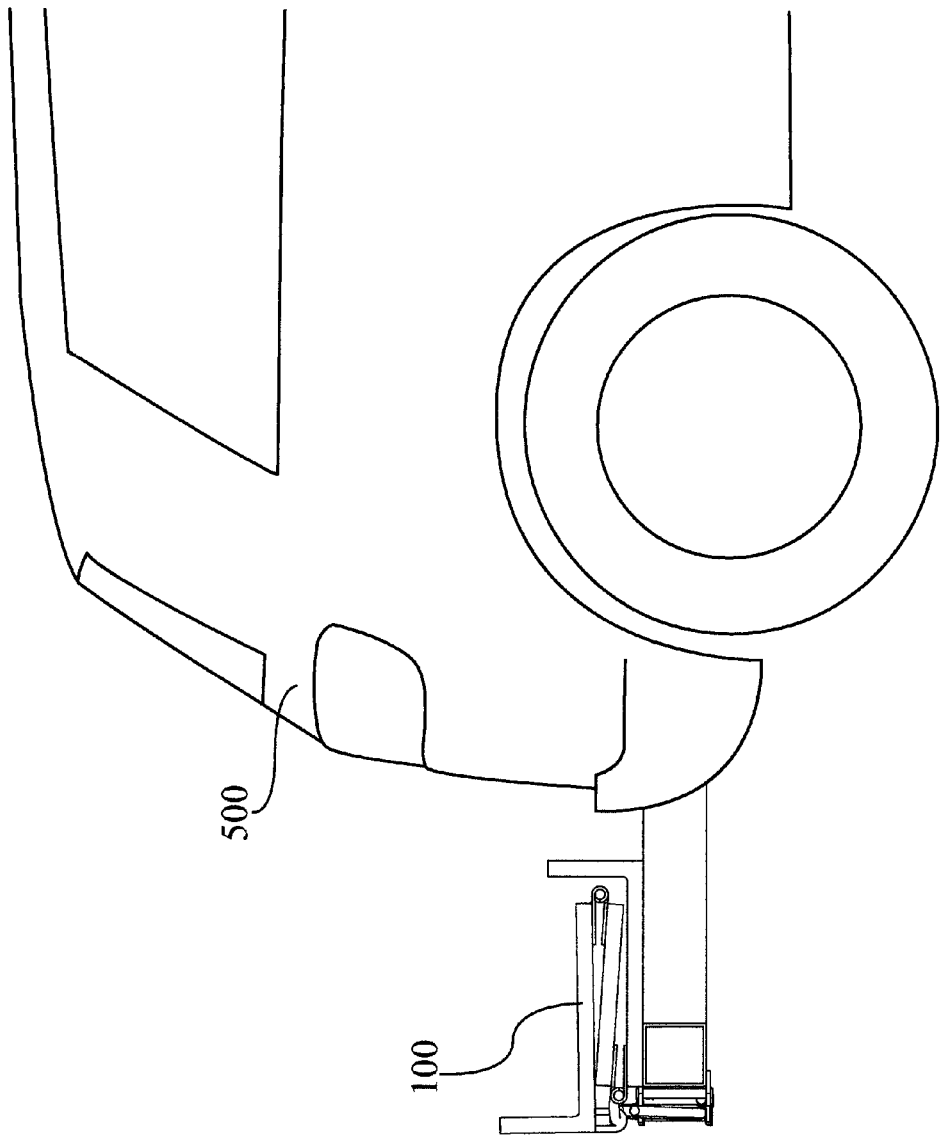
FIG. 18 depicts a side view of the foldable platform 100 of this invention in folded position 106, mounted on a vehicle 500.
Figure 19:
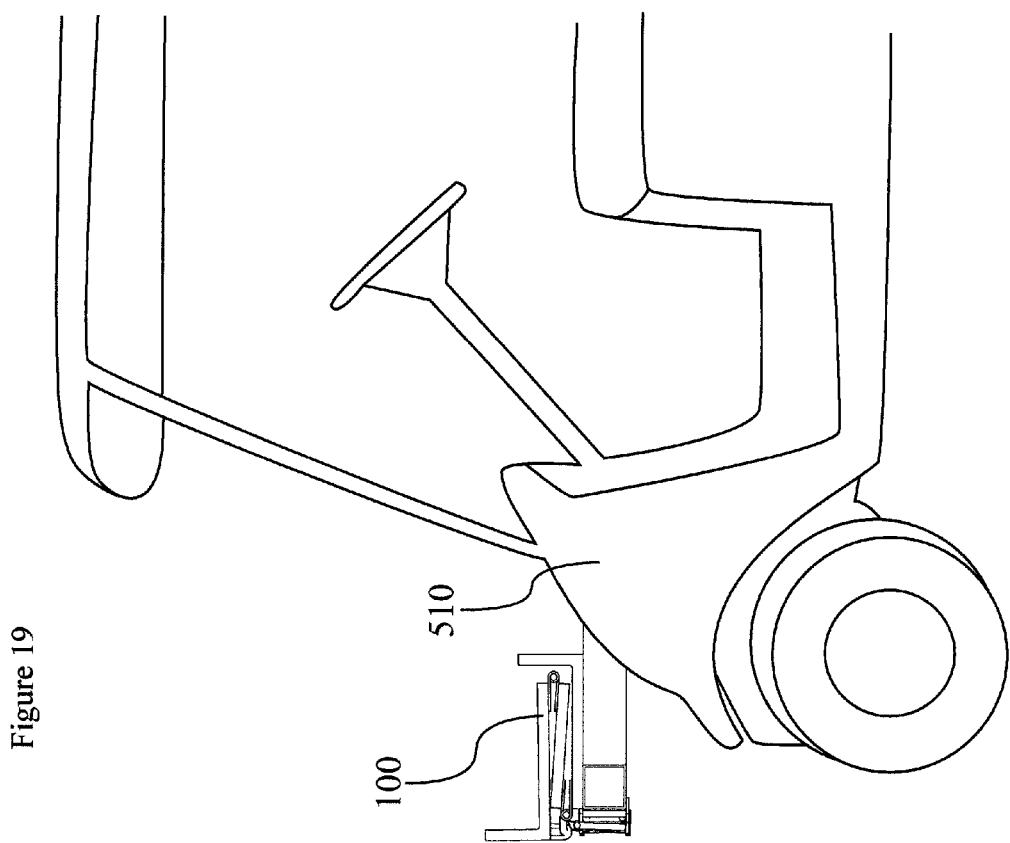
FIG. 19 depicts a side view of the foldable platform 100 of this invention in folded position 106, mounted on a golf cart 510.
Figure 20:
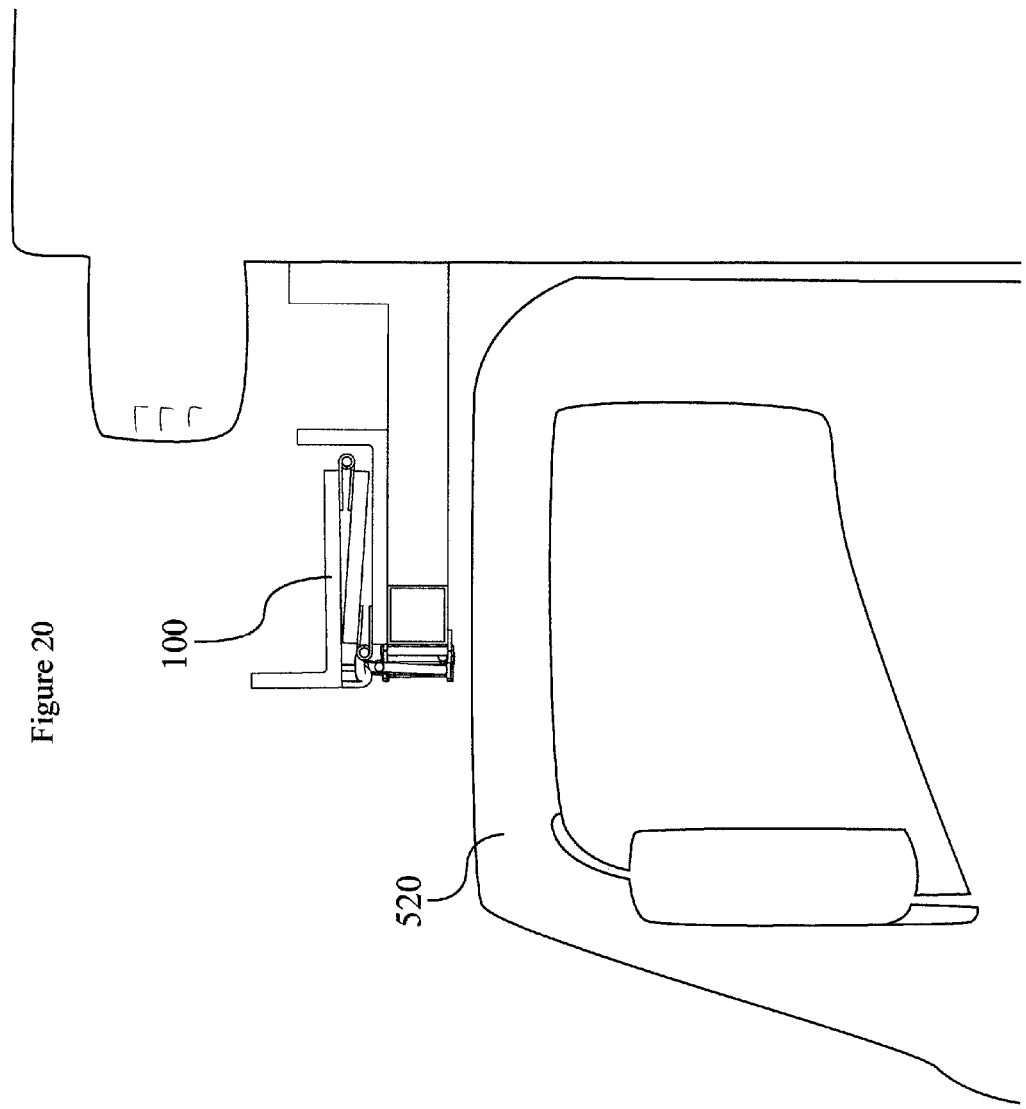
FIG. 20 depicts a side view of the foldable platform 100 of this invention in folded position 106, mounted on a refrigerator truck 520.

In FIG. 18, FIG. 19, and FIG. 20, it may be seen that foldable platform 100 and foldable carrier tray 400 can be mounted on a number of different services. FIG. 18 shows foldable platform 100 mounted on vehicle 500. FIG. 19 shows foldable platform 100 mounted on a golf cart 510. FIG. 20 shows foldable platform 100 mounted on a refrigerator truck 520. Other surfaces 470 are also suitable for mounting foldable carrier tray 400 or foldable platform 100.

Figure 21:
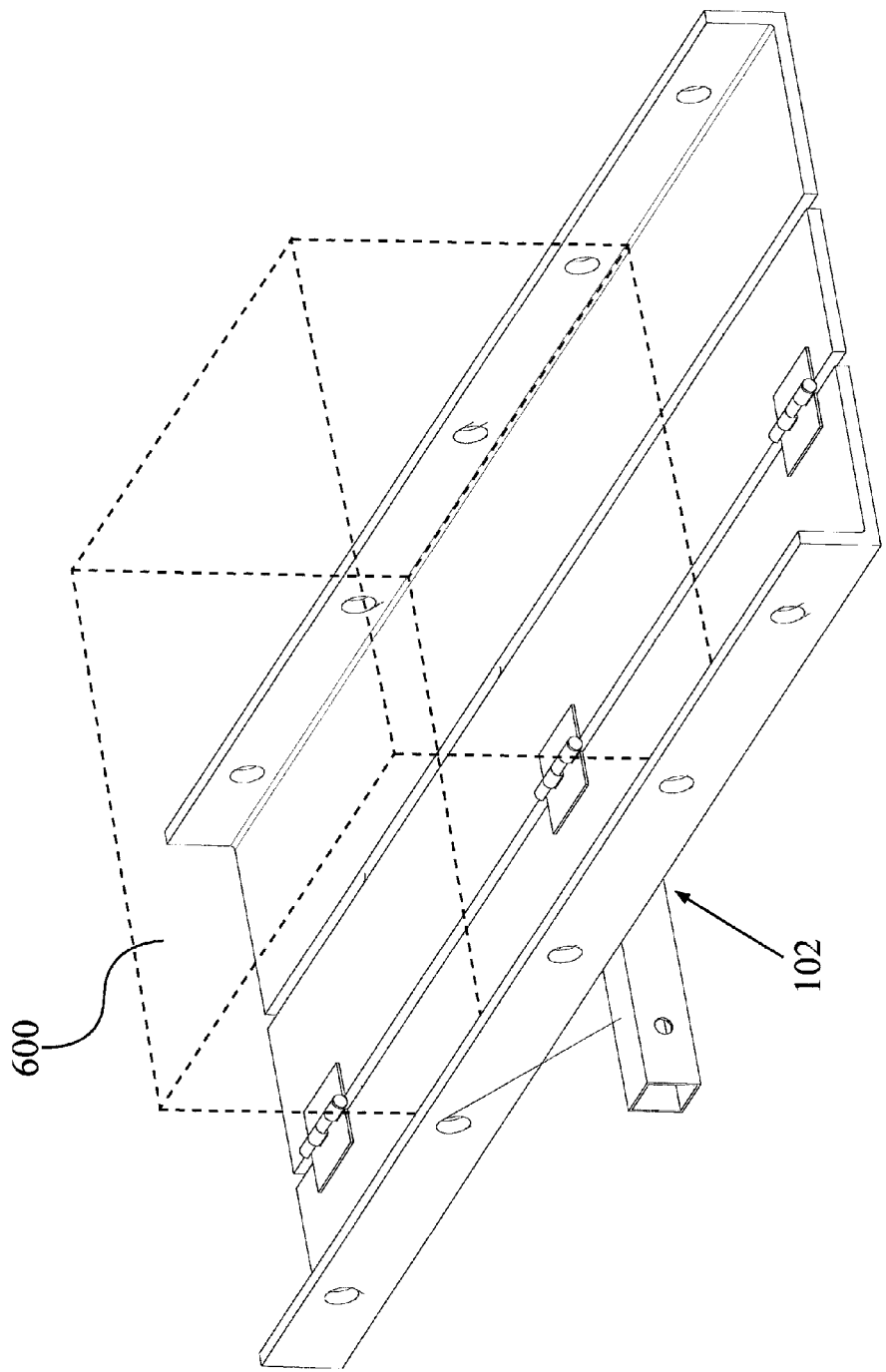
FIG. 21 depicts a front perspective view of the foldable platform 100 of this invention in open position 102 with cargo 600 depicted in phantom.

In FIG. 21, it may be seen that foldable platform 100 in open position 102 can be used to carry a variety of cargo 600. Cargo 600 can include any personal or commercial cargo, including luggage, boxes, bags, furniture, construction materials, bicycles, and the like. Foldable platform 100 can also be mounted on a surface such that cargo 600 can be a human, such as a workman. FIG. 20 shows an embodiment where foldable platform 100 is mounted to the front of a truck 520, wherein a workman can stand on the platform 100 in order to work at higher elevations.

This application; taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A foldable platform, comprising:
    a first section having a top surface and a bottom surface;
    a second section having a top surface and a bottom surface;
    a third section having a top surface and a bottom surface;
    the first section and the second section being movably connected;
    the second section and the third section being movably connected;
    the foldable platform having an open position, a transition position and a folded position;
    the first section and the second section being movably connected;
    the top surface of the first section and the top surface of the second section are in the same plane when the foldable platform is in open position;
    the bottom surface of the first section and the bottom surface of the second section are in the same plane when the foldable platform is in open position;

the top surface of the first section and the top surface of the second section are in contact with each other when the foldable platform is in folded position;
the second section and the third section being movably connected;
the top surface of the second section and the top surface of the third section are in the same plane when the foldable platform is in open position;
the bottom surface of the second section and the bottom surface of the third section are in the same plane when the foldable platform is in open position;
the bottom surface of the second section and the bottom surface of the third section are in contact with each other when the foldable platform is in folded position;
a first support beam being connected to the bottom surface of the first section;
at least one outrigger being provided for the foldable platform;
the at least one outrigger having an open position and a folded position, wherein the at least one outrigger comprises a first arm having a first end and a second end, and a second arm having a first end and a second end;
the first end of the first arm is movably connected to the first support beam by a first outrigger joint;
the second end of the first arm is movably connected to the first end of the second arm by a second outrigger joint; and
the second end of the second arm is movably connected to the bottom surface of the third section by a third outrigger joint.

2. The foldable platform of claim 1 further comprising:
a) the at least one outrigger is in the open position when the foldable platform is in the open position, and the at least one outrigger is in the folded position when the foldable platform is in the folded position; and
b) the at least one outrigger is positioned such that when the at least one outrigger is in the open position and the foldable platform is in the open position, the first arm of the at least one outrigger is substantially beneath the second section of the platform and the second arm of the at least one outrigger is substantially beneath the third section of the platform.

3. The foldable platform of claim 2 further comprising:
a) at least one u-shaped fastener attached to the bottom surface of the third section;
b) the second end of the second arm of the at least one outrigger having a looped end; and
c) the third outrigger joint comprises the looped end of the second end of the second arm being engaged with the u-shaped fastener attached to the bottom surface of the third section, thereby forming the third outrigger joint which movably connects the second end of the second arm to the bottom surface of the third section.

4. The foldable platform of claim 3 further comprising:
a) the connection between the first end of the first arm of the outrigger and the first support of the platform is continuously maintained when transitioning the foldable platform between the open position, the transition position and the folded position; and
b) the connection between the second end of the second arm of the outrigger and the third section of the platform is continuously maintained when transitioning the foldable platform between the open position, the transition position and the folded position.

5. The foldable platform of claim 4 further comprising:
a) the first outrigger joint being a first pivot joint with a first pivot axis, wherein the first pivot axis of the first outrigger pivot joint is substantially perpendicular to first arm of the outrigger; and
b) the second outrigger joint being a second pivot joint with a second pivot axis, wherein the second pivot axis of the second outrigger pivot joint is tilted by four degrees or more relative to the first pivot axis of the first outrigger pivot joint.

6. The foldable platform of claim 4 further comprising:
a) the first section and the second section being movably connected comprises a folding hinge attached to the top surface of the first section and the top surface of the second section; and
b) the second section and the third section being movably connected comprises a folding hinge attached to the bottom surface of the second section and the bottom surface of the third section.

7. The foldable platform of claim 6 further comprising the at least one outrigger being in the open position comprises the second arm of the at least one outrigger being at an angle relative to the first arm of the at least one outrigger, through the second outrigger joint, of between 45 degrees and 85 degrees.

8. In a transport or storage platform the improvement being foldable platform, comprising:
a first section having a top surface and a bottom surface;
a second section having a too surface and a bottom surface;
a third section having atop surface and a bottom surface;
the first section and the second section being movably connected;
the second section and the third section being movably connected;
the foldable platform having an open position, a transition position and a folded position;
the first section and the second section being movably connected;
the top surface of the first section and the top surface of the second section are in the same plane when the foldable platform is in open position;
the bottom surface of the first section and the bottom surface of the second section are in the same plane when the foldable platform is in open position;
the top surface of the first section and the top surface of the second section are in contact with each other when the foldable platform is in folded position;
the second section and the third section being movably connected;
the top surface of the second section and the to surface of the third section are in the same plane when the foldable platform is in open position;
the bottom surface of the second section and the bottom surface of the third section are in the same plane when the foldable platform is in open position;
the bottom surface Of the second section and the bottom surface of the third section are in contact with each other when the foldable platform is in folded position;
a first support beam for the foldable platform, wherein the first support beam is connected to the bottom surface of the first section;
at least one outrigger having an open position and a folded position;
the at least one outrigger having a first arm;
the first arm having a first end and a second end;
a second arm having a first end and a second end;

the first end of the first arm is movably connected to the first support beam by a first outrigger joint;

the second end of the first arm is movably connected to the first end of the second arm by a second outrigger joint; and the second end of the second arm is movably connected to the bottom surface of the third section by a third outrigger joint.

9. The transport or storage platform of claim 8 further comprising:
   a) the at least one outrigger is in the open position when the foldable platform is in the open position, and the at least one outrigger is in the folded position when the foldable platform is in the folded position; and
   b) the at least one outrigger is positioned such that when the at least one outrigger is in the open position and the foldable platform is in the open position, the first arm of the at least one outrigger is substantially beneath the second section of the platform and the second arm of the at least one outrigger is substantially beneath the third section of the platform.

10. The transport or storage platform of claim 9 further comprising:
    a) at least one u-shaped fastener attached to the bottom surface of the third section;
    b) the second end of the second arm of the at least one outrigger having a looped end; and
    c) the third outrigger joint comprises the looped end of the second end of the second arm being engaged with the u-shaped fastener attached to the bottom surface of the third section, thereby forming the third outrigger joint which movably connects the second end of the second arm to the bottom surface of the third section.

11. The transport or storage platform claim 10 further comprising:
    a) the connection between the first end of the first arm of the outrigger and the first support of the platform is continuously maintained when transitioning the foldable platform between the open position, the transition position and the folded position; and
    b) the connection between the second end of the second arm of the outrigger and the third section of the platform is continuously maintained when transitioning the foldable platform between the open position, the transition position and the folded position.

12. The transport or storage platform of claim 11 further comprising:
    a) the first outrigger joint being a first pivot joint with a first pivot axis, wherein the first pivot axis of the first outrigger pivot joint is substantially perpendicular to first arm of the outrigger; and
    b) the second outrigger joint being a second pivot joint with a second pivot axis, wherein the second pivot axis of the second outrigger pivot joint is tilted by four degrees or more relative to the first pivot axis of the first outrigger pivot joint.

13. The transport or storage platform of claim 12 further comprising:
    a) the first section and the second section being movably connected comprises a folding hinge attached to the top surface of the first section and the top surface of the second section;
    b) the second section and the third section being movably connected comprises a folding hinge attached to the bottom surface of the second section and the bottom surface of the third section;
    c) the at least one outrigger being in the open position comprises the second arm of the at least one outrigger being at an angle relative to the first arm of the at least one outrigger, through the second outrigger joint, of between about 135 degrees and about 175 degrees; and
    d) the transport or storage platform being mountable on a vehicle, a vertical surface or a horizontal surface.

\* \* \* \* \*